(12) United States Patent
Leeds

(10) Patent No.: US 7,424,516 B2
(45) Date of Patent: Sep. 9, 2008

(54) SYSTEM AND METHOD FOR ADAPTIVE FORUMS COMMUNICATION

(75) Inventor: Richard Leeds, Bellevue, WA (US)

(73) Assignee: NeonGecko.com, Inc., Seattle, WA (US)

(*) Notice: Subject to any disclaimer, the term of this patent is extended or adjusted under 35 U.S.C. 154(b) by 0 days.

(21) Appl. No.: 11/036,437

(22) Filed: Jan. 13, 2005

(65) Prior Publication Data

US 2005/0125504 A1 Jun. 9, 2005

Related U.S. Application Data

(63) Continuation of application No. 09/813,509, filed on Mar. 20, 2001, now abandoned.

(51) Int. Cl.
*G06F 15/16* (2006.01)
(52) U.S. Cl. ...................... 709/206; 709/218
(58) Field of Classification Search ................ 709/206, 709/218; 705/14
See application file for complete search history.

(56) References Cited

U.S. PATENT DOCUMENTS

| | | | | |
|---|---|---|---|---|
| 5,754,939 A * | 5/1998 | Herz et al. | ................. | 455/3.04 |
| 5,764,916 A | 6/1998 | Busey et al. | | |
| 6,003,032 A * | 12/1999 | Bunney et al. | ................ | 707/10 |
| 6,020,884 A * | 2/2000 | MacNaughton et al. | ..... | 715/747 |
| 6,029,195 A * | 2/2000 | Herz | ......................... | 725/116 |
| 6,212,548 B1 * | 4/2001 | DeSimone et al. | .......... | 709/204 |
| 6,484,196 B1 * | 11/2002 | Maurille | ...................... | 709/206 |
| 6,718,551 B1 * | 4/2004 | Swix et al. | ..................... | 725/32 |
| 6,741,992 B1 * | 5/2004 | McFadden | .................... | 707/10 |
| 7,089,194 B1 * | 8/2006 | Berstis et al. | ................. | 705/14 |
| 2001/0027474 A1 * | 10/2001 | Nachman et al. | ............ | 709/204 |
| 2002/0046102 A1 * | 4/2002 | Dohring et al. | ............... | 705/14 |
| 2002/0099605 A1 * | 7/2002 | Weitzman et al. | ............. | 705/14 |

\* cited by examiner

*Primary Examiner*—Larry D Donaghue
*Assistant Examiner*—Asghar Bilgrami
(74) *Attorney, Agent, or Firm*—Davis Wright Tremaine LLP; George C. Rondeau, Jr.

(57) ABSTRACT

A system and method for adaptive forums provides multiple communication forums in a single instance of a web browser application that actively adapts to conversations therein. In a preferred embodiment, a server system acts as a master controller of a plurality of communication forums. An agent running in the background on the server system monitors the conversations of each forum. When the conversations of different forums sufficiently converge, a temporary communication link is formed. A communication link may be a two-way real-time interaction between users of different forums or simply automated responses using messages stored in a database and associated with the linked forum. Furthermore, establishing the link may entail opening another communication forum on the client computer or directing the messages to a currently open forum. Once a user has connected to one forum controlled by the server system, access to all the other forums controlled by the server system is provided. Embodiments of the present invention provide increased usability over conventional single forum communication, thereby providing users with quick and efficient access to vast amounts of information.

12 Claims, 6 Drawing Sheets

SYSTEM AND METHOD FOR ADAPTIVE FORUMS COMMUNICATION

CROSS REFERENCE TO RELATED APPLICATIONS

This invention is a continuation of U.S. patent application Ser. No. 09/813,509 filed on Mar. 20, 2001 now abandoned.

TECHNICAL FIELD

The invention relates generally to distributed computing environments, and more particularly to a server-client environment involving a system and method to provide adaptive forums communication on a client computer.

BACKGROUND OF THE INVENTION

To take advantage of a distributed computing environment, many current applications are being distributed between client and server computers. The client computers include browser-based applications that communicate over networks with server applications running on the server computers. The browser-user interfaces have become popular given their added features to improve usability of the server applications. The server-client environment is increasingly used for interactive communication forums such as "chat rooms" between Internet users or between retailers, distributors and other entities and their customers or enthusiasts. These chat room applications are popular because they allow a server-end user ("moderator") to communicate quickly and cheaply with many client-end users ("users") at the same time, or the users to communicate with each other. Many chat rooms have become virtual communities where Internet users can enjoy open discussions on a variety of different topics such as music, hobbies, and events.

One conventional chat room method allows users and moderators to communicate via a "post-and-wait" method. Users type a question or comment in a chat room application and wait for a response. Subsequently, other users or the moderator can respond to these messages. Typically, these electronic messages are date and time stamped with a subject header and posted on an electronic bulletin board for all to view. The electronic bulletin boards are categorized by subjects and further group the original messages with their responses. If more then one response is received, they are chronologically posted under the original message.

A second conventional chat room application provides real-time interaction between many users or between the users and the moderator. The real-time interaction is obtained using a "scrolling text" method. Typical scrolling text chat rooms use two dialog fields—a message field and a view field. The user types a question, comment or response in the message field and then posts the message to the view field by pressing "enter" or clicking a "submit" button. The posted message appears in the view field with the user's name, below the last entered message. As new messages are posted, the text in the view field scrolls upward to accommodate the new messages.

Unfortunately, present applications are limited in a number of ways. The post-and-wait method requires the user to search for an electronic bulletin board appropriate to his/her particular question and then to remember to subsequently return to the same electronic bulletin board for an answer. A user may have to view several bulletin boards before finding the sought after information, if it exists at all. Some electronic bulletin boards may provide a search engine tool to help find the correct information, but require the user to consciously use the tool. Furthermore, the post-and-wait method, from the user's perspective, does not allow for a one-on-one real-time interaction by the user with a moderator or another user. Often it can take hours or days before a user receives a response to a message posted to the chat room.

The scrolling text method, while providing real-time interaction, is unable to adequately handle many users and large volumes of information. When several users are participating in the same 'chat session' the questions and answers become hard to follow. The text scrolls quickly up the screen as new messages are constantly being posted to the view field. This text, fast moving at times, can be difficult to read and easy to miss. Furthermore, these sessions cannot save questions and answers posted once a user has exited the chat session. Consequently, user questions can only be answered by other users currently logged on to the same chat session or by a moderator who is actively reading and replying to questions. With the ability of distributed computing networks to connect many users to a server at once, the moderator is often inundated with more questions then manageable. In this case, the real-time interaction is defeated by long queues of unanswered questions.

SUMMARY OF THE INVENTION

The present invention resides in a system and method for adaptive forums communication. Aspects of the system and method include sending an indication of a first uniform resource locator (URL) from a client computer to a server computer across a network communicatively linking the client computer and the server computer. Stored data is collected from at least one of the client computer and the server computer and personalized data about a user of the client computer is collected. Further aspects include displaying a screen including one or more first forums on the client computer based on the first URL, the collected stored data, and the collected personalized data. Messages posted to the one or more first forums as displayed on the screen of the client computer are analyzed to determine if one or more additional forums are to be concurrently displayed with the one or more first forums.

Additional aspects include sending queries from the server computer to the client computer during a key chat when the client computer initially connects to a forum controlled by the server computer and storing responses to the queries in one or more storage devices communicatively linked to the server computer.

Other features and advantages of the invention will become apparent from the following detailed description, taken in conjunction with the accompanying drawings.

DETAILED DESCRIPTION OF THE INVENTION

An adaptive forums communication system 100 and associated method of the present invention is described below. In the following description, numerous specific details are provided to give a thorough understanding of embodiments of the invention. One skilled in the relevant art, however, will recognize that the invention can be practiced without one or more of these specific details, or with other equivalent elements and components, etc. In other instances, well-known components and elements are not shown, or not described in detail, to avoid obscuring aspects of the invention or for brevity.

Figure 1:
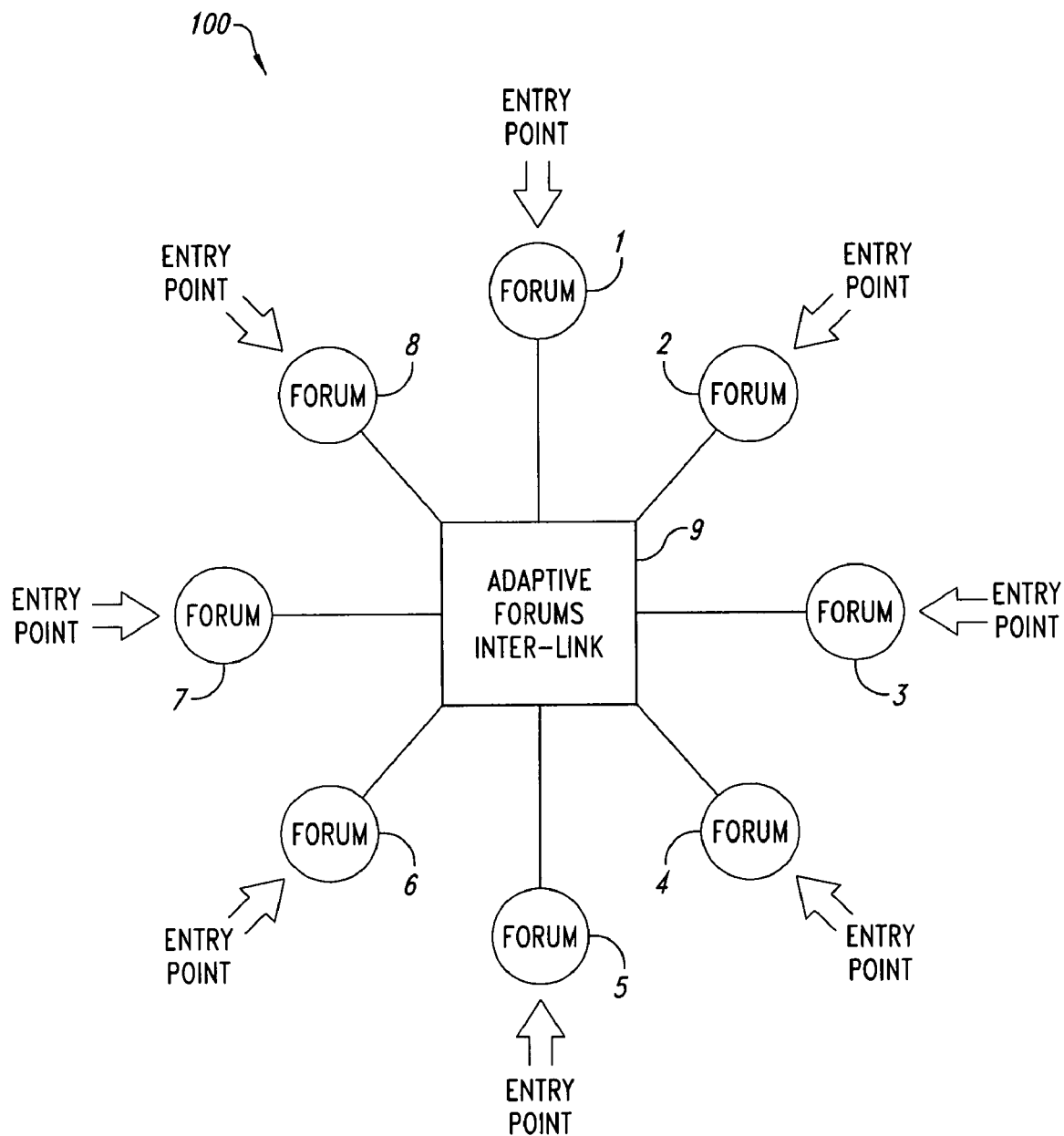
FIG. 1 is a schematic diagram of aspects of an adaptive forums communication system of the present invention directed to a network of adaptive forums interconnected by an adaptive forums inter-link.

The adaptive forums communication system 100 includes a collection of independent adaptive communication forums 1-8 communicatively interconnected by an adaptive forums interlink ("interlink") 9, as depicted in FIG. 1. A forum is a computer web site-based communication facility such as a web site chat room or other computer web site-based forum where network users communicate openly on a variety of topics. However, other forums are topic-specific. Purely for demonstrative purposes, the explanation contained herein will describe the claimed invention in relation to chat room forums, although other forums used for other purposes may still fall within the scope of the invention. Each chat forum is accessed as a web site through a unique Uniform Resource Locator ("URL") such as "www.CatTalk.com" or "www.AOLTalk.com".

The interlink 9 acts as a central hub and master controller establishing and terminating interconnections between the forums 1-8. Although FIG. 1 only depicts eight forums for simplicity, any number of forums may be linked to the interlink 9 concurrently. Interconnection of all the forums 1-8 through the interlink 9 allows for a network of conversations. The interlink 9 monitors these conversations to determine which of the forums 1-8 to communicatively interconnect. If the conversations of two or more of the forums 1-8 converge on a related topic, a communication link between the forums is temporarily established. Once established, an overlapping universe of chat sites is established. In the depicted embodiment described below, both the interlink 9 and the forums 1-8 are embodied in software with a server-based implementation. Other embodiments utilize various other combinations of hardware and software.

Outside users can gain access to the adaptive forums communication system 100, through any one of the forums 1-8. Each of the forums 1-8 acts as a portal to every other forum allowing users to switch chat topics by changing chat forums or participate in several chat topics at once. Switching between the forums 1-8 is accomplished with a graphical user interface ("GUI") control such as a "navigator bar", pull down menus, command line functions, or other suitable control means. Furthermore, a user of one of the forums 1-8 may temporarily gain access to another of the forums through the interlink 9 based upon commonality of subject matter.

An example could have the forum 3 being accessed through a URL "www.CatTalk.com" and the forum 7 being accessed through a URL "www.DogTalk.com". If an Internet user connects to "www.CatTalk.com" using an Internet web browser and posts the following message, "the neighbor's dog chases my cat," the interlink 9 may temporarily interconnect forums 3 and 7. The interconnection may allow users of the two forums 3 and 7 to communicate in real-time or it may simply divert appropriate messages between the forums. Diverted messages are retrieved by the interlink 9 from a database, wherein the messages are stored and indexed according to the forum of origin. The adaptive forum interlink 9 may further provide the user of the forum 3 the option of switching to the forum 7 entirely or the option of engaging in both forums independently yet simultaneously.

Embodiments of the present invention provide custom selections for each user. These selections modify the display format and other functionality allowing the user to dictate, among other things, how many chat forums to engage in at the same time on a single computer screen. The selections are retained from one communication session to another. Furthermore, comments, questions, and answers posted to any of the chat forums are stored in a database for future recall. During each communication session, an agent subroutine is executed as a background routine and without otherwise alerting the user of its execution. The database allows the agent to track and remember a user's interest in particular chat forums. In addition, the agent analyzes posted messages, suggests new chat forums to enter, and even opens new chat forums when the agent determines it would be prudent based upon the current chat forum content. If a message contains a question or comment, the agent can respond with answers stored in the message database or a content database. The agent can act as an aid to the moderator, answering any questions it has an answer to and forwarding all others to the moderator or leaving them to be answered by other users as well as archiving the question. Similarly, if a message contains an answer or comment, it is archived for future recall.

With the above-described features, the adaptive forums communication system 100 provides increased usability over conventional single forum communication. At the same time the present invention can decrease the burden on live moderators to answer questions and can increase the user's rate of access to information. The extensive accumulation of information on the Internet has greatly increased the value of tools that help users quickly and efficiently sort through and access vast amounts of information. By displaying several communication forums on one screen, providing automatic responses to questions, and providing suggestions for new communication forums, the present invention allows a user to sort through more information in less time.

Figure 2:
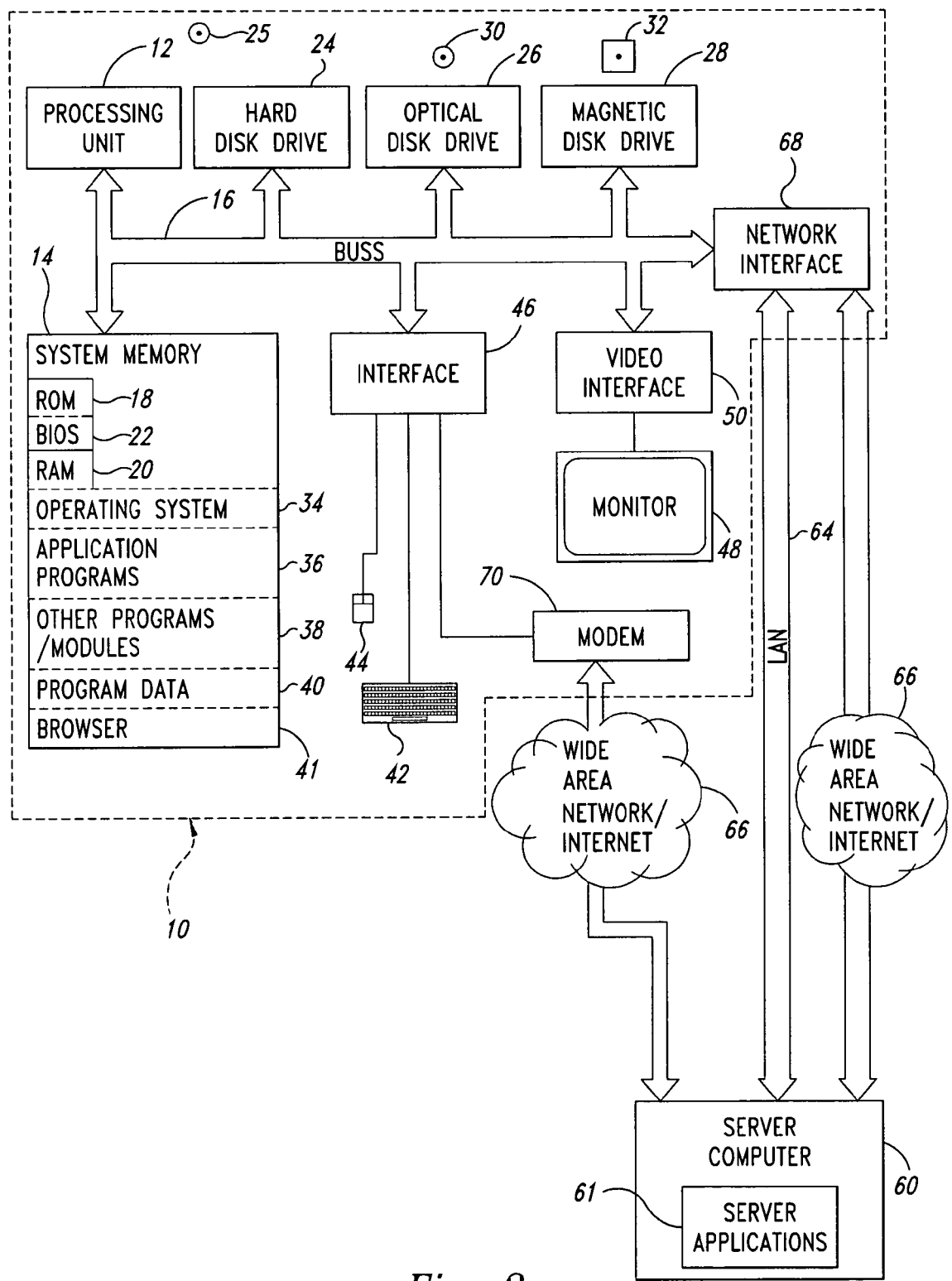
FIG. 2 is a schematic diagram of an embodiment of a computing environment to implement the adaptive forums communication system of FIG. 1.

FIG. 2 and the following discussion provide a brief, general description of a suitable computing environment in which the present invention can be implemented. Although not required, embodiments of the present invention will be described in the general context of computer-executable instructions, such as program application modules, objects, or macros being executed by a personal computer. Those skilled in the relevant art will appreciate that the invention can be practiced with other computer system configurations, including hand-held devices, multiprocessor systems, microprocessor-based or programmable consumer electronics, network PCs, mini computers, mainframe computers, and the like. The invention can be practiced in distributed computing environments where tasks or modules are performed by remote processing devices, which are linked through a communication network. In a distributed computing environment, program modules may be located in both local and remote memory storage devices.

Referring to FIG. 2, a conventional personal computer referred herein as a client computer 10 includes a processing unit 12, a system memory 14 and a system bus 16 that couples various system components including the system memory to the processing unit. The processing unit 12 may be any logic processing unit, such as one or more central processing units ("CPUs"), digital signal processors ("DSPs"), application-specific integrated circuits ("ASICs"), etc. Unless described otherwise, the construction and operation of the various blocks shown in FIG. 2 are of conventional design. As a result, such blocks need not be described in further detail herein, as they will be understood by those skilled in the relevant art.

The system bus 16 can employ any known bus structures or architectures, including a memory bus with memory controller, a peripheral bus, and a local bus. The system memory 14 includes read-only memory ("ROM") 18 and random access memory ("RAM") 20. A basic input/output system ("BIOS") 22, which can form part of the ROM 18, contains basic routines that help transfer information between elements within the client computer 10, such as during start-up.

The client computer 10 also includes a hard disk drive 24 for reading from and writing to a hard disk 25, and an optical disk drive 26 and a magnetic disk drive 28 for reading from and writing to removable optical disks 30 and magnetic disks 32, respectively. The optical disk 30 can be a CD-ROM, while the magnetic disk 32 can be a magnetic floppy disk or diskette. The hard disk drive 24, optical disk drive 26 and magnetic disk drive 28 communicate with the processing unit 12 via the bus 16. The hard disk drive 24, optical disk drive 26 and magnetic disk drive 28 may include interfaces or controllers (not shown) coupled between such drives and the bus 16, as is known by those skilled in the relevant art. The drives 24, 26 and 28, and their associated computerreadable media, provide nonvolatile storage of computer readable instructions, data structures, program modules and other data for the client computer 10. Although the depicted client computer 10 employs hard disk 25, optical disk 30 and magnetic disk 32, those skilled in the relevant art will appreciate that other types of computer-readable media that can store data accessible by a computer may be employed, such as magnetic cassettes, flash memory cards, digital video disks ("DVD"), Bernoulli cartridges, RAMs, ROMs, smart cards, etc.

Program modules can be stored in the system memory 14, such as an operating system 34, one or more application programs 36, other programs or modules 38 and program data 40. The system memory 14 also includes a browser 41 for permitting the client computer 10 to access and exchange data with sources such as web sites of the Internet, corporate intranets, or other networks as described below, as well as other server applications on server computers such as those further discussed below. The browser 41 is markup language-based, such as Hypertext Markup Language (HTML), and operates with markup languages that use syntactically delimited characters added to the data of a document to represent the structure of the document.

While shown in FIG. 2 as being stored in the system memory 14, the operating system 34, application programs 36, other programs/modules 38, program data 40 and browser 41 can be stored on the hard disk 25 of the hard disk drive 24, the optical disk 30 of the optical disk drive 26 and/or the magnetic disk 32 of the magnetic disk drive 28. A user can enter commands and information into the client computer 10 through input devices such as a keyboard 42 and a pointing device such as a mouse 44. Other input devices can include wired or wireless versions of a microphone, joystick, game pad, scanner, etc. These and other input devices are connected to the processing unit 12 through an interface 46 such as a serial port interface that couples to the bus 16, although other interfaces such as a parallel port, a game port or a universal serial bus ("USB") can be used. A monitor 48 or other display device is coupled to the bus 16 via a video interface 50, such as a video adapter. The client computer 10 can include other wired or wireless output devices, such as speakers, printers, etc.

The client computer 10 can operate in a networked environment using logical connections to one or more remote computers, such as a server computer 60 having server applications 61. The server computer 60 can be another personal computer, a server, or other type of computer, and typically includes many or all of the elements described above for the client computer 10. The server computer 60 is logically connected to the client computer 10 under any known method of permitting computers to communicate, such as through a local area network ("LAN") 64 or a wide area network ("WAN") or the Internet 66. Such networking environments are well known in enterprise-wide computer networks, intranets and the Internet.

When used in a LAN networking environment, the client computer 10 is connected to the LAN 64 through an adapter or network interface 68 (communicatively linked to the bus 16). When used in a WAN networking environment, the client computer 10 often includes a modem 70 or other device for establishing communication over the WAN/Internet 66. The modem 70 is shown in FIG. 2 as communicatively linked between the interface 46 and the WAN/Internet 66. In a networked environment, program modules, application programs, or data, or portions thereof, can be stored in the server computer 60. In the depicted embodiment, the client computer 10 is communicatively linked to the server computer through the LAN 64 or WAN/Internet 66 with TCP/IP middle layer network protocols; however, other similar network protocol layers are used in other embodiments. Those skilled in the relevant art will readily recognize that the network connections shown in FIG. 2 are only some examples of establishing communication links between computers, and other links may be used, including wireless links.

Figure 3:
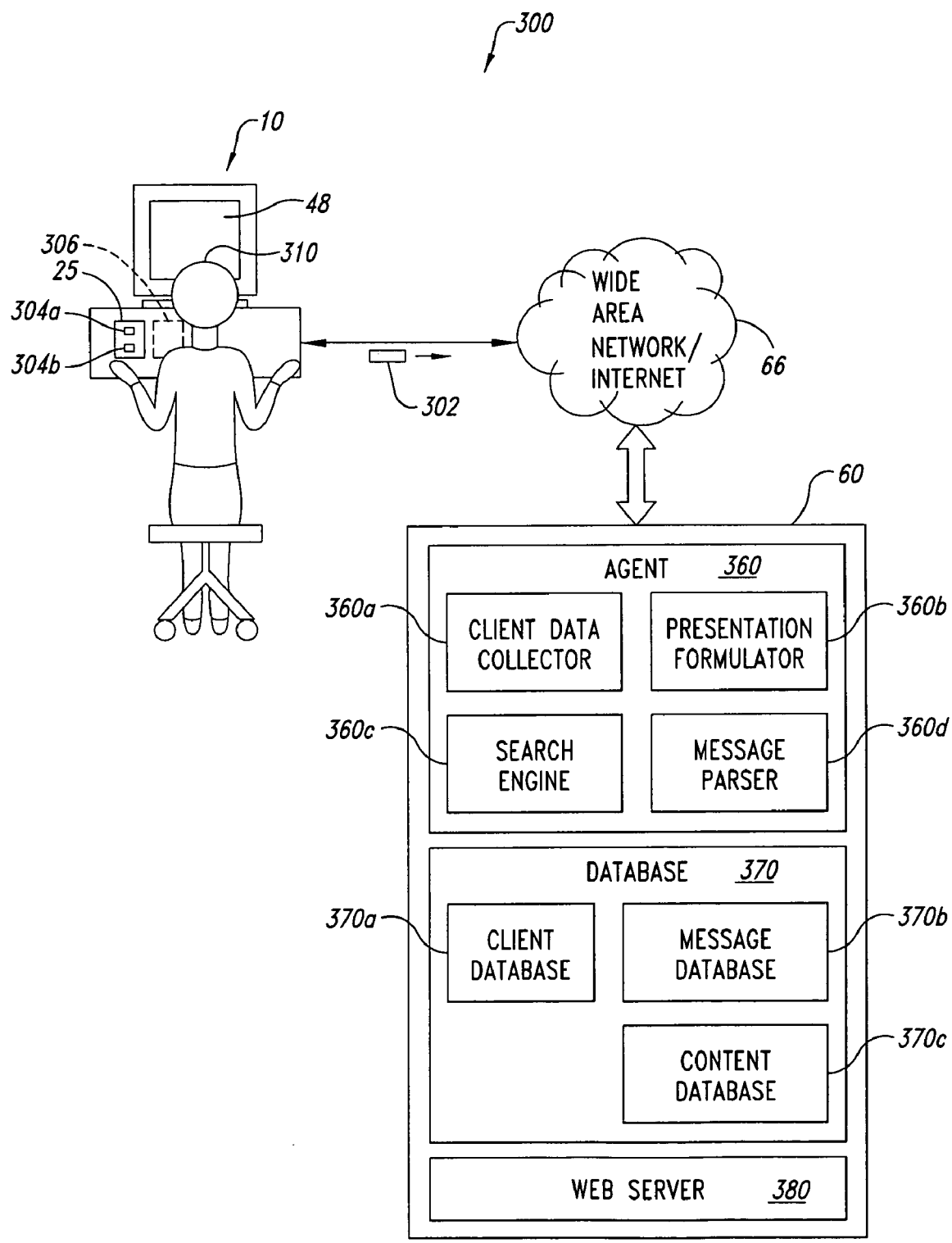
FIG. 3 is a schematic diagram showing further detail of the adaptive forums communication system of FIG. 1 as implemented with the computing environment embodiment of FIG. 2.

An adaptive forums communication system 300 is depicted in FIG. 3 as a server-based implementation of the adaptive forms communication system 100 generally depicted in FIG. 1. The adaptive forums communication system 300 is used by a client user 310 who types or enters by speech or by other methods, such as audio and video files, commands and data 302 into the a client computer 10. In the depicted embodiment, the client computer 10 stores processes and data such as a cookie 304a with cookie data 304b onto the hard drive 25. The commands and data 302 are then sent by the client computer 10 to the server computer 60 by way of a communication network such as the Internet 66.

For the depicted embodiment, the server computer 60 hosts an agent 360, a database 370, and a web server 380. In the preferred embodiment, the agent 360 is a software program running on the server computer 60, but may also be implemented in hardware with an ASIC or other device capable of performing the below described functionality. The agent 360 includes a client data collector 360a, a presentation formulator 360b, a search engine 360c, and a message parser 360d. The database 370 includes a client database 370a, a message database 370b, and a content database.

The client data collector 360a analyzes the commands and data 302 received from the client computer 10 and the cookie data 304b stored on the client computer. The data of the commands and data 302 is analyzed to identify information pertinent to the client user 310 to be used for real-time processing. Personalized user data is forwarded to the presentation formulator 360b for displaying saved user settings on the client computer 10 and to the client database 370a for future use. Examples of saved user settings are forum choices, content preferences, questions, comments, messages, background color, font type, visual and audible prompts, control menu orientation, etc.

If the data of the commands and data 302 contains a question or comment, the client data collector 360a will forward the query to the message parser 360d, which further analyses the data and extracts keywords. These words are then forwarded to the search engine 360c, which uses the extracted keywords to search the message database 370b for a similar query. If a similar query is found, the corresponding answer or comment is sent to the presentation formulator 360b for display on the monitor 48 of the client computer 10. If no similar query is found, the client data collector 360a directs and queues the query to be answered by a live or off-line moderator. Alternatively or in addition, the query may simply be made available for display to other chat room users to answer or comment. If the data of the commands and data 302 contains an answer from the client user 310 to another user's question, both the answer and the question will be stored in the message database 370b as well as posted to one or more of the forums through the presentation formulator 360b. Methods of implementing the message parser 360d and the search engine 360c are well known to those of ordinary skill in the relevant art. In an alternative embodiment a grammar engine is used in lieu of or in addition to the message parser 360d. As known in the art, when parsing a message, a grammar engine uses the grammatical context and proximity of words and phrases.

As described above, the agent 360 can automatically respond to messages posted through the client computer 10 by the user 310, if a relevant answer or comment is saved in the database 370. With time, a critical mass of answers, questions, and comments will accumulate in the database 370 allowing the agent 360 to respond to many incoming messages.

Another important function implemented by the agent 360 is initiating display of chat forums in addition to those being displayed or diverting messages between a currently active chat forum and another chat forum based on content of messages sent through the active chat forum or the entry of clients with known preferences or user settings. By monitoring chat forums, the agent 360 determines when to establish temporary links between previously unconnected forums. This method of adapting the forums based on message content or participating clients being communicated through the forums can be accomplished by parsing the messages of each forum and comparing the parsed message to a list of words and phrases associated with each forum. Alternatively, the agent 360 could directly compare the parsed messages associated with different forums. If the agent 360 finds a match, a new interconnection is established. An interconnection can be a two-way real-time interaction allowing the participants of each interconnected forum to fully interact or a one-way interaction wherein stored messages from one forum are forwarded to another.

The database 370 is communicatively linked to the agent 360. It can utilize any device capable of storing the data supplied to it by the agent 360, such as a hard disk, an optical drive, a CD-ROM or DVD-ROM drive, a tape drive, or the like. The data stored in the client database 370a may be indexed to an individual or a group of individual users. Similarly, the message database 370b may index the stored questions, answers, and comments of each forum to keywords, phrases or entire queries. The keywords and phrases are also stored in the client database 370a and indexed to each forum. In addition, content database 370c contains an external database of questions, answers, and comments including voice files, multimedia graphics, image, audio and video, and real-time data. External third party databases can also be used to supply informational contents. For instance, for a health talk site or a cat talk site, a content database can supply information on a drug manufacturer or a cat food manufacturer.

The server computer 60 contains functional components directed to the agent 360, the database 370, and web server 380 shown in FIG. 3. These components can be physically implemented in a variety of ways, for instance they can be software processes or hardware contained in the one server computer 60. Alternatively, each of the functional components can be separate processes running on separate computers or be all standalone devices (not shown). The method of implementing the functional components is of little importance, if the functionality described herein is performed. In the depicted embodiment, some of the functional components of the server system 60 are implemented with Unix Solaris, by SUN, Microsoft NT 4.0, Oracle 8.0, SQL language, and Visual Basic. Other embodiments use various other processes, platforms, operating systems, computer languages, ASICs, and devices to implement the functional components.

In the depicted embodiment, the client computer 10 runs a World Wide Web browser 306, known as a web client, such as Netscape Navigator or Microsoft's Internet Explorer. The web browser 306 sends data to the web server 380, which is a computer program or set of programs running on the server computer 60. The web server 380 and web browser 306 interact with one another and send data and commands to one another using Hypertext Transport Protocol ("HTTP"). It is within this web browser environment that the depicted embodiment operates to implement the adaptive forums communication system 300.

When the client computer 10 communicates with the server computer 60 to initiate a session with a chat forum, the presentation formulator 360b will display an adaptive forum environment on the monitor 48 of the client computer 10. The client computer 10 sends a request to the server computer 60 to download a web page containing a particular forum specified by a URL. A forum-specific screen is displayed on the monitor 48 which is tailored to the particular URL used to access the adaptive forums communication system 300. This forum-specific screen will contain a first forum as requested by the specified URL and possibly other forums depending upon the personalized information stored in the client database 370a and associated with the particular user of the client computer 10.

The forum-specific screen may be further customized by the user via menu functions, function keys, or the like. Such customizations may include background screen color, font size, font type, number of forums allowed open at once, and other similar userselective characteristics. These customizations and user-selective characteristics are stored in a cookie contained in a memory device of the client computer 10 or in the client database 370a of the server computer 60. Furthermore, the customizations and userselective characteristics are automatically applied each time the client computer 10 connects to any of the adaptive forums controlled by the server computer 60.

Figure 4:
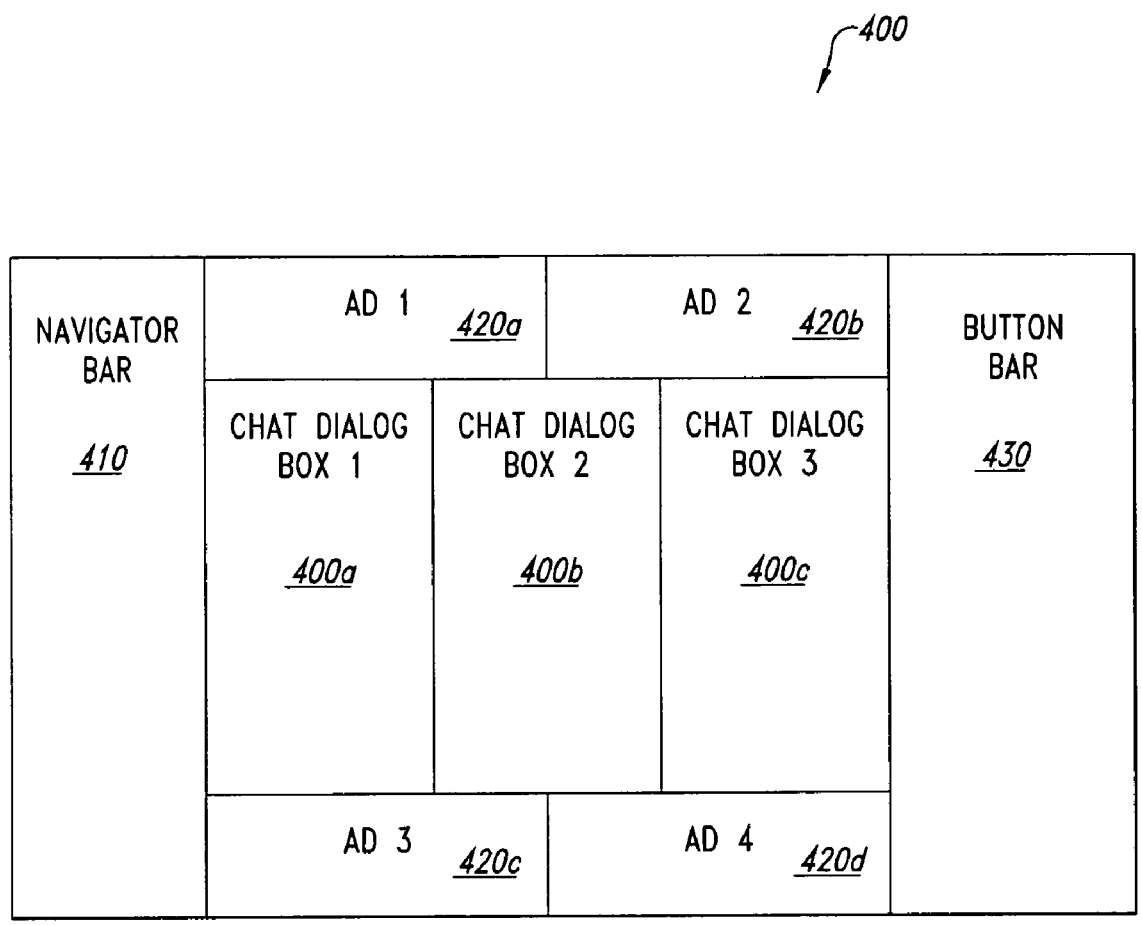
FIG. 4 is a schematic diagram of a screen layout of an embodiment of an exemplary, tailored chat room.

An example of a forum-specific screen 400 is shown in FIG. 4. The forum-specific screen 400 has chat dialog boxes 400a, 400b, and 400c each associated with independent chat forums having separate chat sessions. A navigator bar 410 provides the user 310 with a means to interact with the server computer 60 to modify the viewing environment, select other chat forums, and control other functions. Ads 1 through 4 are used as advertisement fields (420a, 420b, 420c, and 420d, respectively). The advertisement fields may randomly or sequentially display various advertisements. Sequential changes of displayed advertisements may be controlled according to words and phases entered in a chat session or according to personal information on the user 310 stored in the client database 370a and in the cookie data 304b. A button bar 430 provides the user 310 with a means to interactively select a manner of how to display data on the user's browser.

Although the depicted embodiment shows three chat dialog boxes (400a, 400b, and 400c), any number of chat dialog boxes may be open concurrently. This allows a user to participate in several chat forums simultaneously. Each dialog box may be arbitrarily wide and adjustable by the user or automatically shaped to equally share the available screen space. Similarly, the number and size of the advertisement fields 420a420d is variable. The navigator bar 410 and button bar 430 may be a number of different sizes and shapes, or even implemented by a drop down menu, function keys, or other common practices in the art.

The chat dialog boxes 400a-400c can use the "post-and-wait" chat method, or alternatively, the "scrolling text" chat method. It is also possible that one chat dialog box uses post-and-wait, while another uses scrolling text. The present invention may also include a modification to the post-and-wait method described above by using a drop down menu wherein messages may be entered for posting to the chat forum. The drop down menu would allow the user to post messages without requiring the web browser to overwrite the entire screen with an updated page. This drop down menu could be located at the top of each chat dialog box, the bottom of each chat dialog box or at another suitable location.

If the user 310 is using the embodiment of the adaptive forums communication system 300 for the first time, the agent 360 can ask the user 310 a number of questions. These questions are posed by the agent 360 to obtain personal information about the user 310 for adapting the adaptive forums communication system 300 to the particular user. Typical questions could include: "What is your birth date?", "Are you married?", "What is your anniversary?", "Are you interested in animals?", etc. The above questions are only asked once in an initial "key chat" and the answers are stored either on the client computer 10 and/or in the client database 370a. The agent can ask these questions in a separate pop up window or simply ask the questions in the first forum opened by the user 310. The method of obtaining the personal information is not important as long as it is obtained and saved for future access and processing.

The present invention is further adaptable to the particular user 310 by extracting information contained in the "header field" of the data of the commands and data 302. This information can be used to determine pertinent information about the user 310 and formulate which chat sessions to open. An example of the information contained in the header field is the user's Internet Protocol ("IP") address. Comparing the user's IP address to known IP addresses of popular Internet Service Providers ("ISPs") provides the agent 360 with the necessary information to suggest new chat sessions. For example, if the user 310 is an America Online ("AOL") user, the header field of the data will contain an AOL registered IP address. The client data collector 360a would extract this address and compare it to a known list of ISP addresses. From this, the agent would know the user 310 is an AOL user and may suggest or automatically open a chat dialog box for AOL users.

Figure 5:
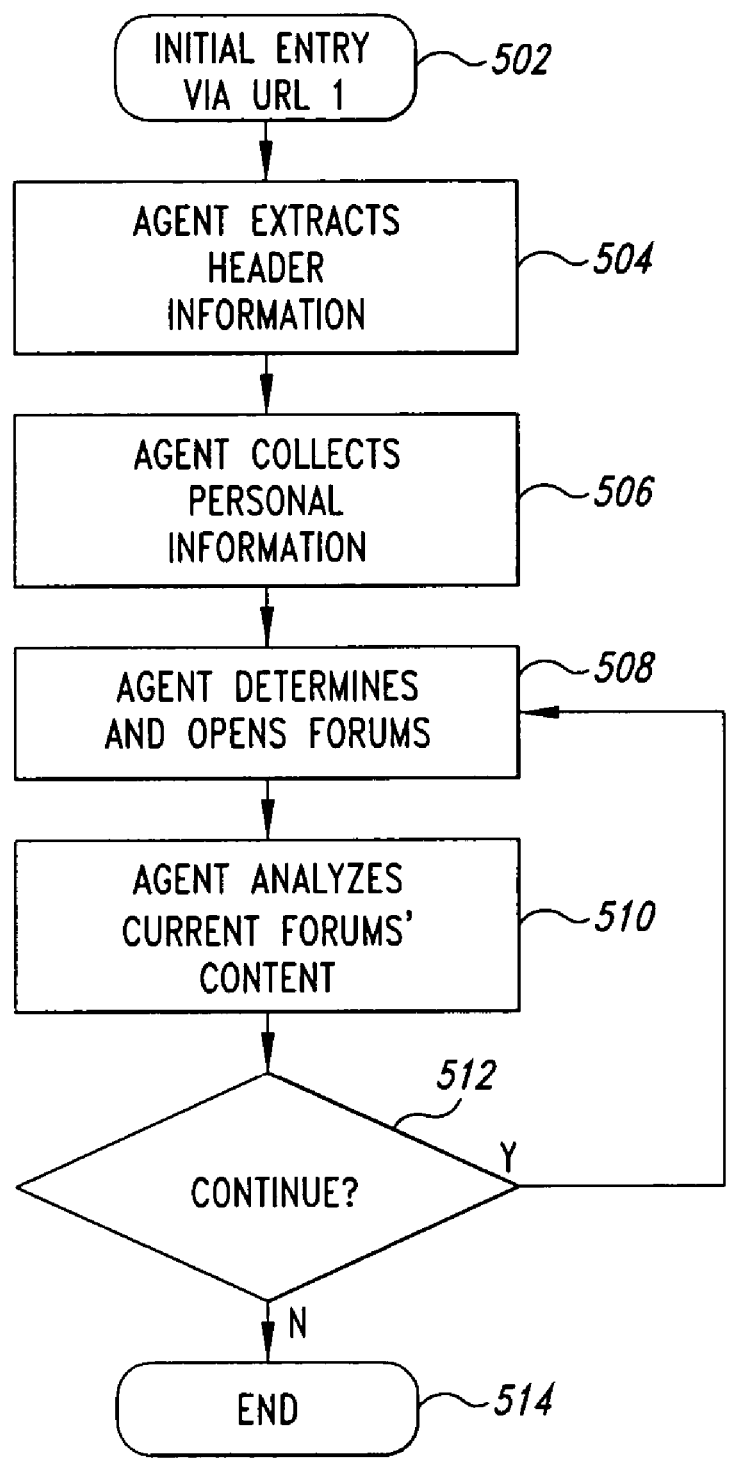
FIG. 5 is a flow chart depicting a method used by embodiments of the adaptive forums communication system of FIG. 1 to collect information from and communicate with a user during an initial phase of operation.

For example, referring to FIG. 5, suppose the user 310 initiates communication with the adaptive forums communication system 300 through the URL "www.CatTalk.com" for the first time (step 502), using AOL as an ISP. In response, the agent 360 would extract header information (step 504) contained in the data packets sent from the client computer 10 to the server computer 60. In addition, the agent 360 would perform a one-time event of asking the user 310 to answer personal questions and storing the answers (step 506). Next, the agent 360 would open (step 508) the "CatTalk" chat forum to be displayed in a chat dialog box on the monitor 48 as explicitly requested by the user 310 when connecting to the URL "www.CatTalk.com". The "AOLTalk" chat forum would be opened (step 508) and displayed in a chat dialog box on the monitor 48 as a result of the IP address extracted (step 504) from the header field of a data packet sent by the client computer 10. Suppose the user 310 posts the statement, "my cat tore my drapes" to the "CatTalk" chat forum. The agent 360 could analyze the phrase (step 510) and pick out the words "cat" and "drapes" and branch back, under a "yes" condition (step 512), to suggest (step 508) to the user, in a navigator bar or another appropriate place, to open other cat related chat forums. In a similar manner, the agent 360 may suggest a chat forum called "AllAboutDrapes." Alternatively, the agent 360 could automatically open (step 508) these chat forums to be displayed in dialog boxes on the monitor 48. In an alternative implementation, the user 310 could limit the number of dialog boxes the agent 360 may open. If no further communication is occurring, the agent 360 branches under the "no" condition (step 512) to end the procedure (step 514).

Figure 6:
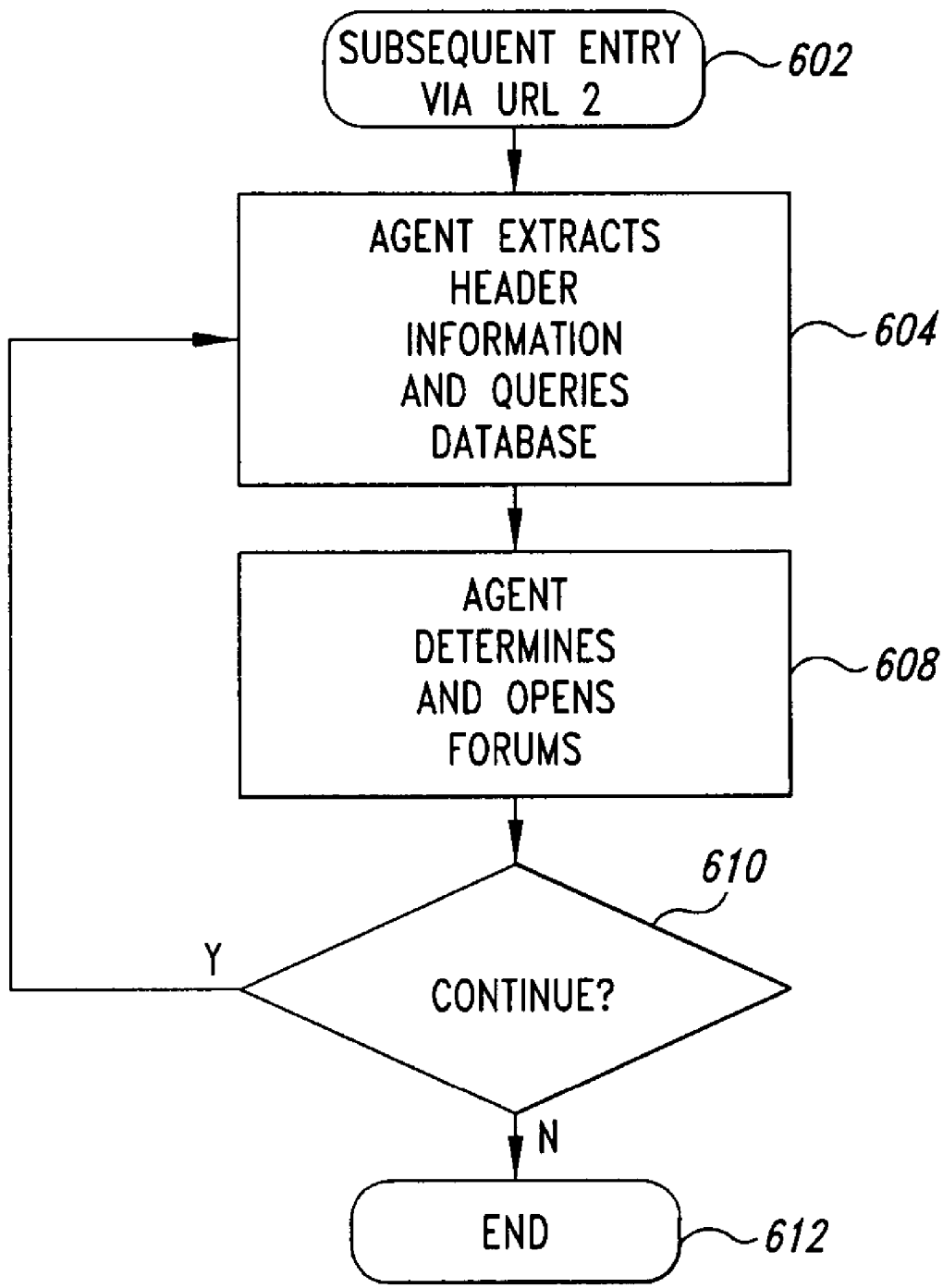
FIG. 6 is a flow chart depicting a method used by embodiments of the adaptive forums communication system of FIG. 1 for subsequent phases of operation.

Finally, suppose the user 310 terminates the portion of the adaptive forums communication system 300 running on the client computer 10. Referring to FIG. 6, the next time the user 310 connects to one of the adaptive chat forums (step 602), such as "www.AOLTalk.com", all screen customizations from the previous chat sessions would be fetched from the database 370 (step 604) and redisplayed on the monitor 48. The agent 360 would open (step 608) the "AOLTalk" chat dialog box to be displayed on the monitor 48 as requested. The stored data would indicate to the agent 360 that the user 310 is interested in cats. Therefore, the agent 360 would open (step 608) the "CatTalk" chat dialog box to be displayed on the monitor 48. Further, suppose today is the user's anniversary. The agent 360 would open (step 608) a third chat dialog box called "AnniversaryChat." Opening a chat dialog box in anticipation of a calendar day could also apply to holidays and special events such as Valentine's Day or Mother's Day. The agent 360 continues to open additional forums under the "yes" condition (step 610) until no further chat-based indication exists to continue, thus triggering the "no" condition (step 610) to end the procedure (step 612).

The above example highlights how the present invention is adaptable and customizable to a specific user. However, as mentioned, the agent 360 can further provide the function of answering questions or commenting on messages posted to a chat session. A company could use the adaptive forums communication method to provide customers a convenient Internet forum to ask questions about the company's products or services. A customer could open several chat dialog boxes, each linked to a separate chat forum relating to different company products. These chat sessions would allow the customer to interact with other customers who have experience with the particular product or pose questions to the moderator, who in this case would be the company's customer service representative. The agent 360 running in the background could answer common questions and forward novel questions to the moderator. It could also suggest or open a new chat forum on a related product that may be of interest to the customer based upon the message content of the current chat session. In this manner, automated responses and suggestions give the customer the appearance of a one-on-one real-time interaction with a customer service representative without a representative's actual participation. This allows customer service representatives to focus on novel questions or questions which are not amenable to automated responses, while the agent 360 provides quick automated responses to the rest.

Another possible embodiment allows the user 310 to subscribe to a number of post-and-wait chat rooms. For example, suppose that AOLTalk, CatTalk, and AllAboutDrapes are three different post-and-wait chat forums to which the user 310 has subscribed. If a message is posted to the CatTalk forum, the agent 360 could notify the user 310 of that posting. The notification could take the form of a small message in the navigator bar 410 or another suitable location. Alternatively, the agent 360 could open a CatTalk dialog box to be displayed on the monitor 48 with the message displayed. The agent 360 could monitor the other chat forums in a similar manner, allowing the user 310 to assign priority levels to particular forums, thereby, ordering incoming messages. Yet, another alternative would deliver messages posted to a forum of which the user 310 has subscribed via email.

Active forums are always displayed on the monitor 48 of the client computer 10 and updated depending upon the forum type as described heretofore. Assigning a forum a top-priority level ensures that the forum remains classified as an active forum, and therefore always displayed. Forums assigned lower-priority levels may become inactive forums and therefore not displayed. If multiple forums have been opened on the client computer 10 by the user 310 or the server computer 60 and assigned priority levels less than the top-priority level, only a number of the lower-priority forums will be displayed concurrently on the monitor 48. The user 310 can specify this number of lower-priority forums to be displayed. After a message is posted to an inactive lower-priority forum, the forum will become active forcing a currently active lower-priority forum to become inactive. In this way, the lower-priority forums compete for display screen time, replacing each other as messages are posted to the inactive forums.

Hidden data that is stored on or generated by the client computer 10, such as the client computer's IP address, may be gathered by the client data collector 360a of the server computer 60 without notifying the user 310. Examples of such hidden data include the cookie data 304b on the client computer 10 or data stored in other files on the hard disk 25 of the client computer 10. Cookies were originally designed to permit servers to save information on a client computer between invocations of a web browser. Cookies are now of more general use so that cookie data may contain a wealth of information about a user's habits and interests including particular chat rooms frequented by the user 310. Pertinent user information found in this hidden data can also be used by the presentation formulator 360b and web server 380 to generate tailored chat room screens.

Although the database 370 includes a client database 370a, personal information could be stored entirely in the cookie data 304b or in other files on the hard disk 25. Alternatives to the client database 370a could be used to store user information necessary to redisplay past customizations after the web browser on the client computer 10 is closed.

From the foregoing it will be appreciated that, although specific embodiments of the invention have been described herein for purposes of illustration, various modifications may be made without deviating from the spirit and scope of the invention. Accordingly, the invention is not limited except as by the appended claims.

It is claimed:

1. A method to provide adaptive forums within a single instance of a web browser application, the method comprising:
   at a server computer, receiving an indication of a first uniform resource locator ("URL") from a client computer across a network communicatively linking the client computer and the server computer;
   displaying a screen on the client computer including one or more first forums based on the first URL;
   analyzing messages posted to the one or more first forums as displayed on the client computer to identify a topic for each message;
   simultenous with analyzing messages posted to the one or more first forums, analyzing each message posted to one or more second forums not displayed on the client computer to identify a topic for each message;
   determining a topic of a first message posted to at least one of the first forums has converged with a topic of a second message posted to at least one of the second forums, the first message having been posted substantially contemporaneiously with the second message; and
   diverting the second message to the at least one of the first forums for display thereby on the client computer.

2. The method of claim 1, further comprising:
   collecting personalized data about a user of the client computer comprising:
      sending queries from the server computer to the client computer during a key chat when the client computer initially connects to a forum controlled by the server computer, and
      storing responses to the queries in one or more storage devices communicatively linked to the server computer;
   using the personalized data about the user to select a third message posted to at least one of the second forums; and
   diverting the third message to the at least one of the first forums for display thereby on the client computer.

3. The method of claim 1, further comprising diverting the first message to the at least one of the second forums for display thereby.

4. The method of claim 1 wherein the first URL particularly identifies one of the one or more first forums.

5. The method of claim 1 wherein the one or more first forums and the one or more second forums are chat forums.

6. The method of claim 1, further comprising:
   collecting stored data from at least one of the client computer and the server computer including information collected from previous forum connections and stored in a database on the server computer or a cookie on the client computer; and
   using the collected stored data to display the screen on the client computer including the one or more first forums.

7. A method comprising:
   displaying concurrently one or more first forums within a single instance of a web browser application;
   analyzing messages posted to the one or more first forums displayed on a screen of the client computer; determining when a topic of a first message posted to an identified forum of the one or more first forums has converged with a topic of a second message posted to at least one second forum; and
   temporarily interconnecting the identified forum with the at least one second forum so that postings to the identified forum appear on the at least one second forum and postings to the at least one second forum appear on the identified forum.

8. The method of claim 7 wherein the one or more first forums and the at least one second forum are chat forums.

9. The method of claim 7, further including automatically formatting the one or more first forums and the one or more second forums to substantially equally share an area on the screen of the client computer.

10. An adaptive forum communication system communicatively linked to one or more client computers, the adaptive forum communication system comprising:

a plurality of unconnected communication forums each configured to receive messages from the one or more client computers, each message having a topic; and a forum interlink communicatively coupled to each of the communication forums of the plurality of communication forums, the forum interlink being configured to:

monitor the messages received by each of the communication forums;

detect the topic of each message;

determine when the topic of a first message received by a first communication forum has converged with a topic of a second message received by a second communication forum; and interconnect the first communication forum and second communication forum to display both the first message and the second message in both the first communication forum and the second communication forum.

11. The adaptive forum communication system of claim 10, wherein the forum interlink further comprises a message parser configured to parse each message received by each of the first and second communication forums and detect the topic of each message.

12. The adaptive forum communication system of claim 10, wherein each message comprises one or more words, and the topic of each message comprises a portion of the one or more words of the message.

* * * * *